Feb. 26, 1957
H. C. LIEN
2,783,046
BALL
Filed Feb. 14, 1955
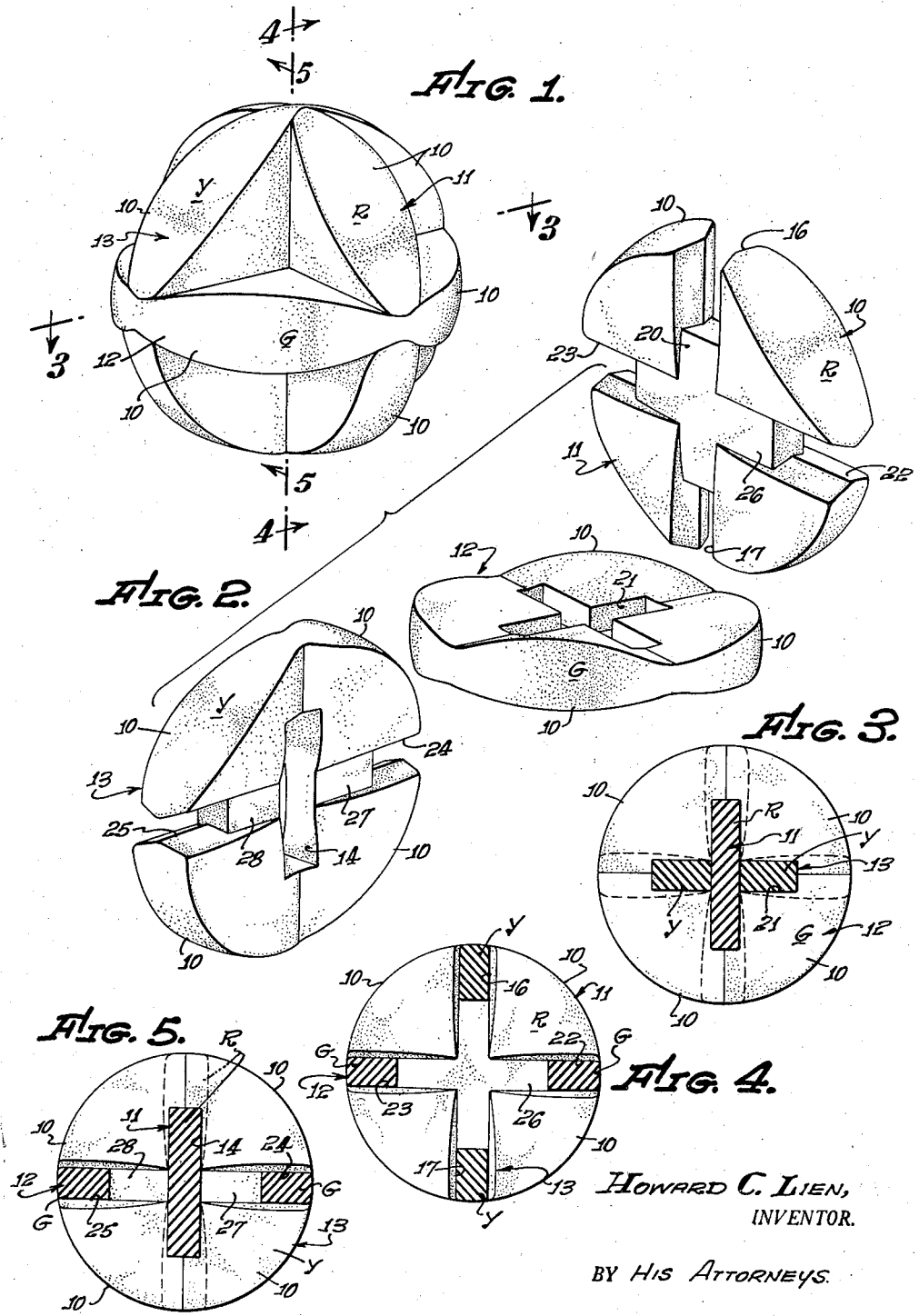
Howard C. Lien,
INVENTOR.
BY His Attorneys.
Harris, Kiech, Foster & Harris.

United States Patent Office 2,783,046
Patented Feb. 26, 1957

2,783,046
BALL

Howard C. Lien, Downey, Calif., assignor of ten percent to Duncan S. Duff, fifteen percent to Julia Duff, twenty-five percent to Jack M. Hart, Los Angeles, and fifty percent to John S. and Frances Marie Dekema, husband and wife, Arcadia, Calif., as joint tenants Application February 14, 1955, Serial No. 487,754

1 Claim. (Cl. 273—58)

This invention relates to a ball-like structure and, in particular, to a structure having interstices therein so that it may be readily gripped.

It is an object of the invention to provide a ball structure composed of a plurality of interlocking elements which coact to produce a composite surface including spaced projections and interstices.

Another object of the invention is to provide a ball structure composed of a plurality of elements which are made of a temporarily deformable material, such as sponge rubber or the like, and which are interlockingly engaged by the insertion of one element through an opening in a second element which is normally too small to admit the first element.

An object of the invention is to provide a structure, having a plurality of spaced interstices therein, which may be made in the form of a sphere so that it will roll freely on a flat surface and which is equally well adapted to be made in other forms, such as a football, a block and the like.

The invention also comprises novel details of construction and novel combinations and arrangements of parts, which will more fully appear in the course of the following description. However, the drawings merely show and the description merely describes a preferred embodiment of the present invention as applied to a three-element spherical ball, which is given by way of illustration or example only.

In the drawings:

Fig. 1 is an isometric view of a preferred embodiment of the invention;

Fig. 2 is an exploded view of the embodiment of Fig. 1;

Fig. 3 is a sectional view of the embodiment of Fig. 1 taken along the line 3—3;

Fig. 4 is a sectional view of the embodiment of Fig. 1 taken along the line 4—4; and Fig. 5 is a sectional view of the embodiment of Fig. 1 taken along the line 5—5.

A ball structure having a plurality of radially extending projections 10 is illustrated in Fig. 1. In this embodiment of the invention the outer portions of the projections 10 coincide with the surface of an imaginary sphere enveloping the ball structure. However, it will be clear from the description and the drawings that the invention is equally applicable to structures having other enveloping surfaces, such as ellipsoidal and cubical. The structure of Fig. 1 is composed of three interlocking elements 11, 12, 13 shown individually in Fig. 2. When it is desired to make a varicolored ball, each of the elements 11, 12, 13 may be given a different color and in the drawing the elements are indicated as being respectively red (R), green (G) and yellow (Y).

The desired interlocked structure is easily obtained when one or more of the elements 11, 12, 13 are made of a temporarily deformable material, thus doing away with the requirement of a latching mechanism or a sealing operation. A material such as sponge rubber which may be molded into the desired shape is suitable for use with the invention.

The yellow element 13 is provided with an opening 14 at the center thereof. Portions of the periphery of the red element 11 are removed producing a pair of opposing notches 16, 17 and a pair of opposing notches 22, 23, four projections 10 being formed between the notches. The central portion 20 of the red element between the notches 16, 17 is preferably the same size as the opening 14 in the yellow element.

In assembling the ball structure of Fig. 1, two adjacent projections 10 of the red element are inserted though the opening 14 in the yellow element so that the central portion 20 of the red element lies within the opening 14. This is easily accomplished when the elements are made of sponge rubber or similar material since the projections may be compressed and the opening may be enlarged, the elements returning to their normal shapes after being assembled together.

An X-shaped opening 21 is provided in the center of the green element 12, and a pair of opposed peripheral notches 24, 25, similar to the notches 22, 23 in the red element, is provided in the yellow element. The previously engaged red and yellow elements may now be inserted through the opening 21 of the green element so that a central portion 26 of the red element lying between the notches 22, 23 and portions 27, 28 of the yellow element lying between the notches 24, 25 will substantially fill in the opening 21 of the green element. The insertion of the red and yellow elements into the green element is accomplished in a manner similar to the previously described insertion utilizing the temporarily deformable property of the elements.

The angular relation of the planes occupied by the various elements may be controlled by the walls of the openings 14 and 21 and the surfaces of the central portions 20, 26, 27 and 28. When the walls of the opening 14 are normal to the plane occupied by the yellow element and the surfaces of the portion 20 are parallel to the plane occupied by the red element, the planes occupied by the respective elements when engaged will be normal to each other. Similarly, when the walls of the opening 21 are normal to the plane occupied by the green element and the surfaces of the central portions 26, 27 and 28 are parallel to the planes occupied by their respective elements, the plane occupied by the green element will be normal to both the plane occupied by the red element and the plane occupied by the yellow element. The embodiment of the invention illustrated in Fig. 1 utilizes such an angular relationship, this being a simple way of obtaining a spherical ball structure. However, it is clear that the teachings of the invention may be utilized to provide structures having varying angular relationships.

When the red, yellow and green elements are assembled into the ball structure of Fig. 1, the abutting portions of the various elements form continuous bands around the periphery of the ball structure, thus providing a shape which is readily grasped and which rolls freely on a flat surface. However, such bands are not essential to the practice of the invention. It is clear that each of the projections 10 could be divided into two or more smaller projections and also that the ends of projections 10, which are shown meeting each other, need not do so.

Although several exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

In a ball structure, the combination of three interlocking elements, the first of said elements having a cross-shaped central portion and four segments projecting outward radially and axially beyond said cross-shaped central portion and filling the interstices between the arms of said cross-shaped central portion forming four peripheral notches, the depth of each of said notches being approximately equal to the length of the corresponding arm of said cross-shaped central portion, the second of said elements having a rectangular central portion and two double segments joined to opposing long sides of and projecting outward radially and axially beyond said rectangular central portion, said second element having a centrally positioned rectangular opening therethrough, said rectangular central portion and opening lying in a plane and normal to one another, said first and second elements being compressible permitting two of said four segments to be passed through said rectangular opening to position two opposing arms of said cross-shaped central portion within said rectangular opening forming an engaged pair of elements, and the third of said elements comprising four additional segments joined at their outer corners forming a cross-shaped central opening therethrough, said third element being compressible permitting one of said double segments and two of said four segments of said engaged pair of elements to be passed through said cross-shaped opening to position said rectangular central portion and the other two opposing arms of said cross-shaped central portion within said cross-shaped opening, said rectangular and cross-shaped openings being completely filled by said cross-shaped and rectangular central portions, each of said elements being of substantial thickness with said segments being thicker than said central portions, each of said elements being formed of a resilient, temporarily compressible material.

References Cited in the file of this patent

UNITED STATES PATENTS

| | | |
|---|---|---|
| 2,521,703 | Emmitt | Sept. 12, 1950 |
| 2,712,200 | Dearling | July 5, 1955 |

FOREIGN PATENTS

| | | |
|---|---|---|
| 157,153 | Great Britain | Aug. 11, 1921 |